United States Patent
Huang

(10) Patent No.: US 6,408,715 B1
(45) Date of Patent: Jun. 25, 2002

(54) STEERING WHEEL COVER

(76) Inventor: Yuan-Yuan Huang, No. 33, Lane 75, Sec. 2, Chung-Cheng N. Rd., Kuei-Jen Hsiang, Tainan Hsien (TW)

( * ) Notice: Subject to any disclaimer, the term of this patent is extended or adjusted under 35 U.S.C. 154(b) by 22 days.

(21) Appl. No.: 09/644,534

(22) Filed: Aug. 24, 2000

(51) Int. Cl.$^7$ .................................................. B62D 1/06
(52) U.S. Cl. ...................................................... 74/558
(58) Field of Search ........................................... 74/558

(56) References Cited

U.S. PATENT DOCUMENTS 5,743,154 A * 4/1998 Jacinth ......................... 74/558
5,848,559 A * 12/1998 Harrill .......................... 74/558

* cited by examiner

Primary Examiner—Rodney H. Bonck
Assistant Examiner—Eric M. Williams
(74) Attorney, Agent, or Firm—Finnegan, Henderson, Farabow, Garrett & Dunner, L.L.P.

(57) ABSTRACT

A steering wheel cover includes an annular hollow core layer, a flexible lining layer, and a hook-and-loop fastening unit. A core layer has an inner annular peripheral edge that is formed with a slot therealong to permit access into a receiving space. The core layer further has an outer wall surface, and an inner wall surface with opposing edge parts disposed on opposite lateral edges of the slot. The lining layer has a pair of marginal portions disposed respectively on opposing sides of the covering portion. The marginal portions extend into the receiving space of the core layer via the slot, and overlap respectively the edge parts of the inner wall surface of the core layer. The fastening unit is provided on the edge parts and on the marginal portions to fasten removably the lining layer to the core layer.

4 Claims, 4 Drawing Sheets

STEERING WHEEL COVER

BACKGROUND OF THE INVENTION

1. Field of the Invention

The invention relates to a steering wheel cover, more particularly to one with a replaceable lining layer.

2. Description of the Related Art

A steering wheel is optionally provided with a cover to improve handleability and enhance the aesthetic effect. Referring to FIGS. 1 and 2, a conventional steering wheel cover 1 is shown to include an annular hollow core layer 13 and a flexible lining layer 14. The core layer 13 has a generally C-shaped radial cross-section, and is formed from a shape-retaining resilient material, such as a rubber material. The core layer 13 confines an annular receiving space 11 for receiving a steering wheel (not shown) therein, and has an inner annular peripheral edge that is formed with a slot 12 therealong to permit access into the receiving space 11, thereby permitting insertion of the steering wheel into the receiving space 11. The lining layer 14 can be made of natural or synthetic leather or flannel, and has a covering portion 141 that lines an outer wall surface of the core layer 13 for enhanced comfort when gripping the steering wheel cover 1. The lining layer 14 further has a pair of marginal portions 142 disposed respectively on opposing lateral sides of the covering portion 141. The marginal portions 142 extend into the receiving space 11 via the slot 12, and lie against an inner wall surface of the core layer 13. With the use of a sewing tool, the lining layer 14 is secured to the core layer 13 by forming a pair of seams 15 that extend through the covering portion 141, the core layer 13 and a respective one of the marginal portions 142.

The following are some of the drawbacks of the aforesaid conventional steering wheel cover 1:

1. The lining layer 14 easily gets soiled when the steering wheel cover 1 is in use. However, since the lining layer 14 is sewn to the core layer 13, the lining layer 14 cannot be removed for washing. There is thus a need for frequent replacement of the steering wheel cover 1, thereby resulting in waste and higher costs.

2. Since the seams 15 extend to the covering portion 141, they are visible from the outside and can adversely affect the appearance of the steering wheel cover 1.

SUMMARY OF THE INVENTION

Therefore, the object of the present invention is to provide a steering wheel cover with a replaceable lining layer that is clear of the aforesaid drawbacks.

According to this invention, a steering wheel cover includes an annular hollow core layer, a flexible lining layer, and a hook-and-loop fastening unit. The core layer has a generally C-shaped radial cross-section, and is formed from a shape-retaining resilient material. The core layer confines an annular receiving space, and has an inner annular peripheral edge that is formed with a slot therealong to permit access into the receiving space. The core layer further has an outer wall surface, and an inner wall surface with opposing edge parts disposed respectively adjacent to opposite lateral edges of the slot. The lining layer has a covering portion that lines the outer wall surface of the core layer, and a pair of marginal portions disposed respectively on opposing lateral sides of the covering portion. The marginal portions extend into the receiving space of the core layer via the slot, and overlap respectively the edge parts of the inner wall surface of the core layer. The fastening unit is provided on the edge parts of the inner wall surface of the core layer and on the marginal portions of the lining layer to fasten removably the lining layer to the core layer.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
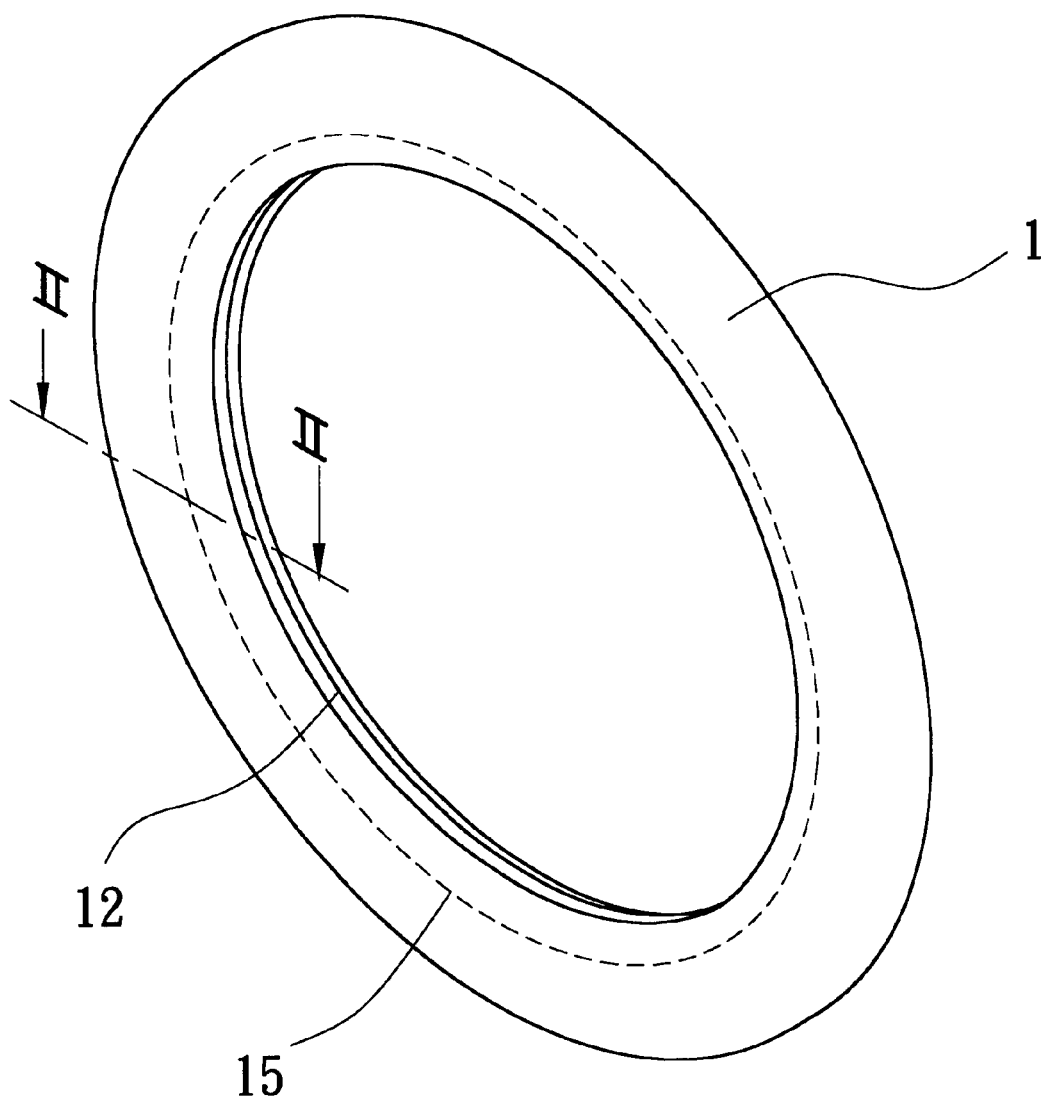
FIG. 1 is a perspective view showing a conventional steering wheel cover.
Figure 2:
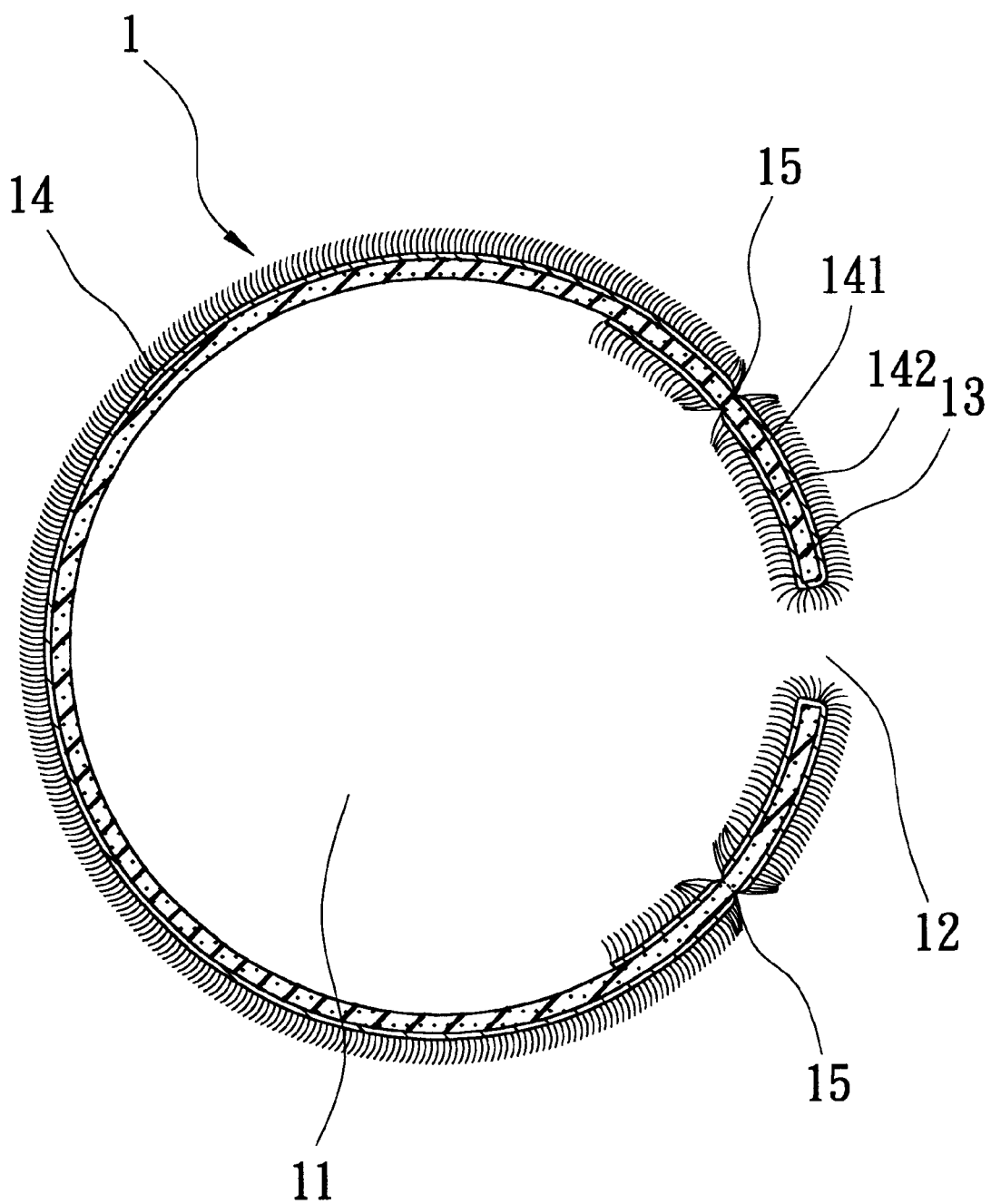
FIG. 2 is a cross-sectional view of the conventional steering wheel cover, taken along lines II—II in FIG. 1.
Figure 3:
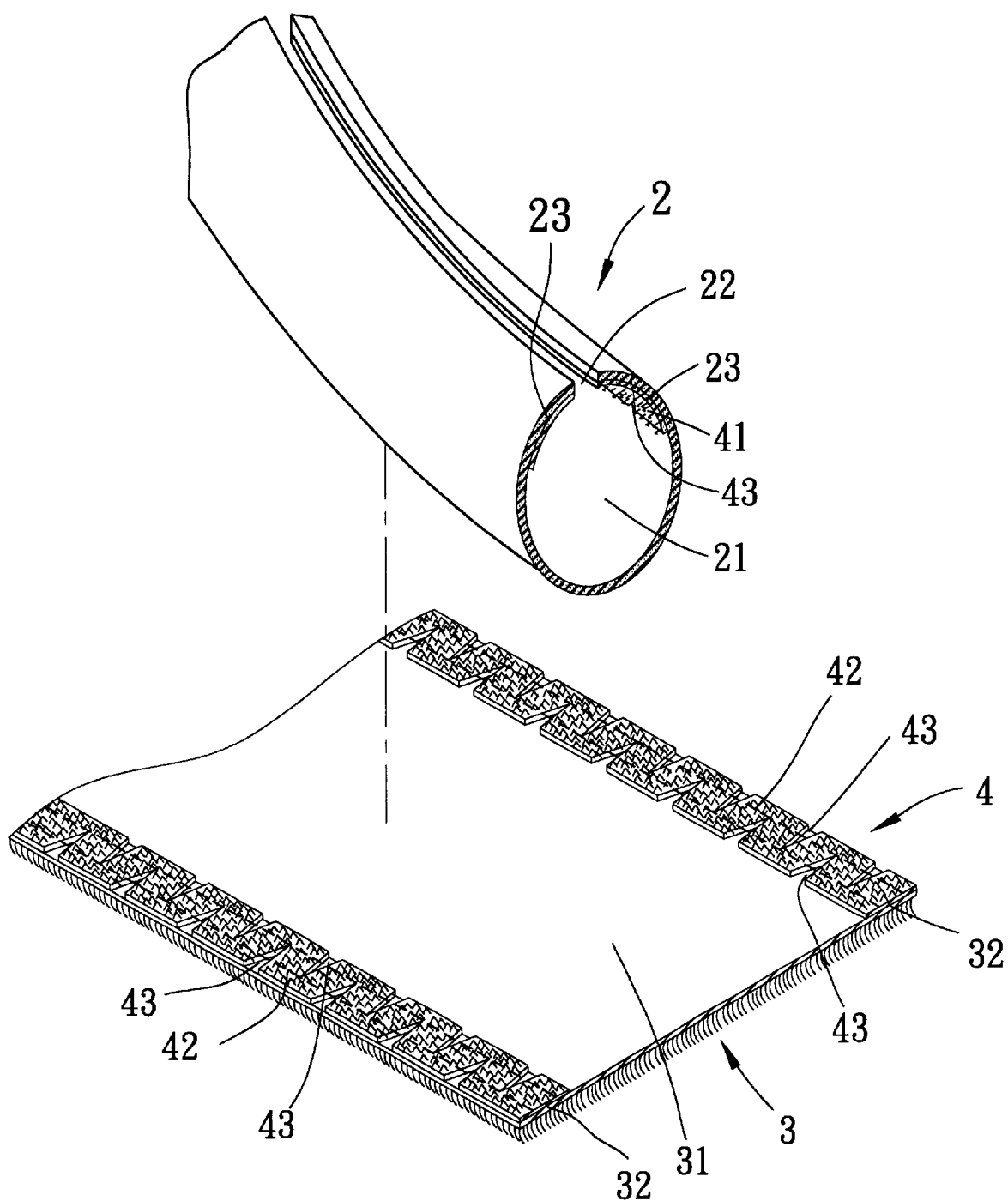
FIG. 3 is a fragmentary, exploded and partly sectional view of the preferred embodiment of a steering wheel cover according to the present invention.
Figure 4:
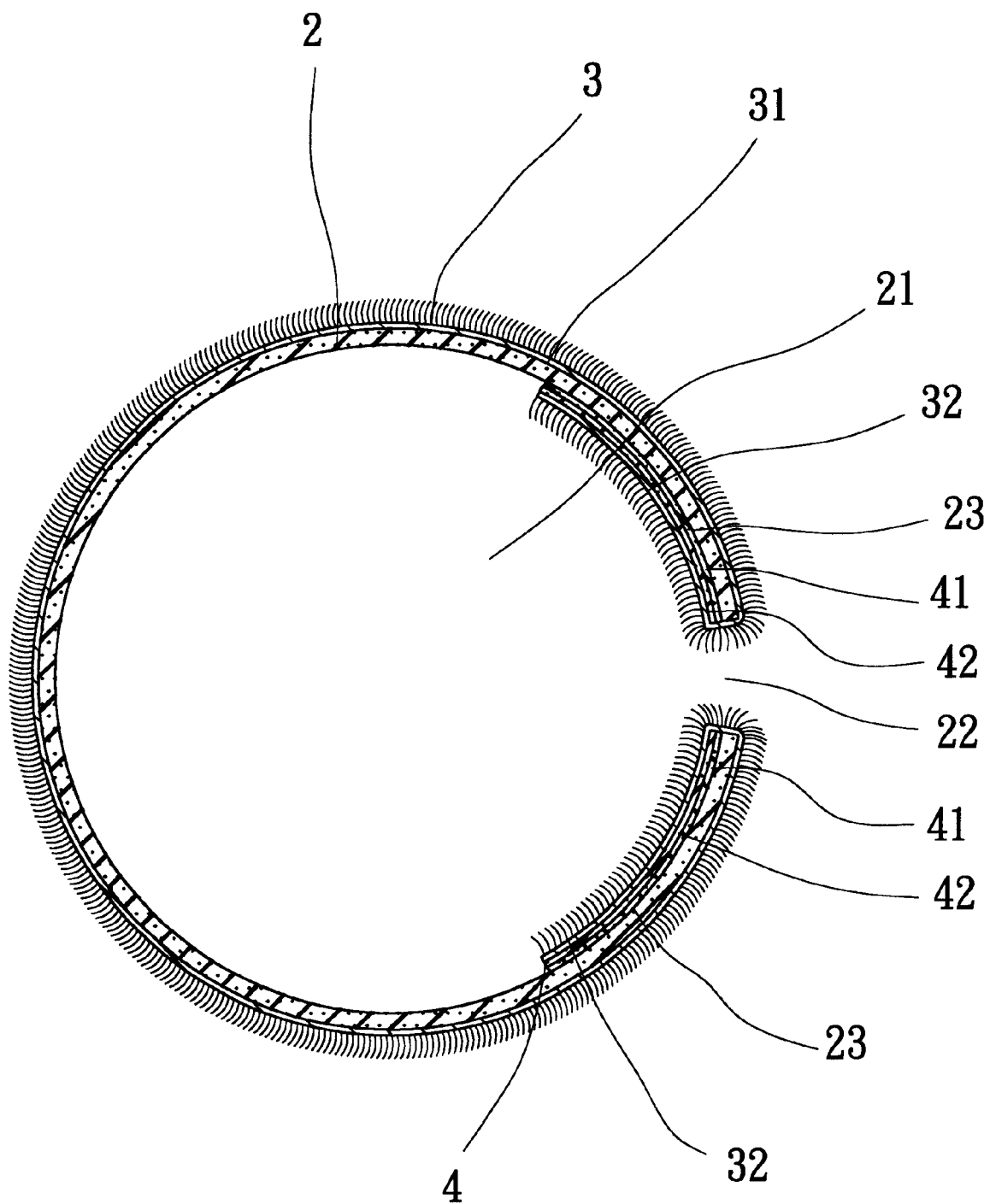
FIG. 4 is a cross-sectional view of the preferred embodiment.

Referring to FIGS. 3 and 4, the preferred embodiment of a steering wheel cover according to this invention is shown to include an annular hollow core layer 2, a flexible lining layer 3, and a hook-and-loop fastening unit 4.

The core layer 2 has a generally C-shaped radial cross-section, and is formed from a shape-retaining resilient material, such as a rubber or soft plastic material. The core layer 2 confines an annular receiving space 21 for receiving a steering wheel (not shown) therein, and has an inner annular peripheral edge that is formed with a slot 22 therealong to permit access into the receiving space 21, thereby permitting insertion of the steering wheel into the receiving space 21. The core layer 2 further has an inner wall surface with opposing edge parts 23 disposed adjacent to opposite lateral edges of the slot 22, respectively. Preferably, the inner wall surface of the core layer 2 is roughened to increase traction with the steering wheel.

The lining layer 3 can be made of natural or synthetic leather or flannel, and has a covering portion 31 that lines an outer wall surface of the core layer 2. The lining layer 3 further has a pair of marginal portions 32 disposed respectively on opposing lateral sides of the covering portion 31. The marginal portions 32 extend into the receiving space 21 via the slot 22, and overlap the edge parts 23, respectively.

The hook-and-loop fastening unit 4 includes a pair of first fastening strips 41 and a pair of second fastening strips 42. The first fastening strips 41 are secured to the edge parts 23, respectively, such as by sewing. The second fastening strips 42 are secured to the marginal portions 32, respectively, such as by sewing. The second fastening strips 42 engage removably and respectively the first fastening strips 41 in a known manner so as to fasten removably the lining layer 3 to the core layer 2. To facilitate attaching of the fastening strips 41, 42 to the core and lining layers 2, 3, each of the fastening strips 41, 42 has opposite longitudinal edges, each of which is formed with a plurality of generally V-shaped notches 43 that are uniformly spaced apart along the respective longitudinal edge. The notches 43 on the opposite longitudinal edges of a same one of the fastening strips 41, 42 are staggered relative to each other, thereby permitting stretching of the fastening strips 41, 42.

Because the fastening unit 4 fastens removably the lining layer 3 to the core layer 2, the lining layer 3 can be washed when soiled and even replaced when damaged or worn out.

In addition, because no seams extend to the covering portion 31 of the lining layer 3, the neat appearance of the steering wheel cover of this invention can be ensured.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A steering wheel cover comprising:

an annular hollow core layer with a generally C-shaped radial cross-section and formed from a shape-retaining resilient material, said core layer confining an annular receiving space, and having an inner annular peripheral edge that is formed with a slot therealong to permit access into said receiving space, said core layer further having an outer wall surface, and an inner wall surface with opposing edge parts disposed respectively adjacent to opposite lateral edges of said slot;

a flexible lining layer having a covering portion that lines said outer wall surface of said core layer, and a pair of marginal portions disposed respectively on opposing lateral sides of said covering portion, said marginal portions extending into said receiving space of said core layer via said slot, and overlapping respectively said edge parts of said inner wall surface of said core layer; and a hook-and-loop fastening unit provided on said edge parts of said inner wall surface of said core layer and on said marginal portions of said lining layer to fasten removably said lining layer to said core layer, wherein said fastening unit includes a pair of first fastening strips secured respectively to said edge parts, and a pair of second fastening strips secured respectively to said marginal portions, said second fastening strips engaging removably and respectively said first fastening strips so as to fasten removably said lining layer to said core layer.

2. The steering wheel cover of claim 1, wherein each of said first and second fastening strips has opposite longitudinal edges, each of which is formed with a plurality of notches that are spaced apart therealong.

3. The steering wheel cover of claim 2, wherein said notches are generally V-shaped and are uniformly spaced apart along the respective one of said longitudinal edges of said first and second fastening strips.

4. The steering wheel cover of claim 2, wherein said notches on said opposite longitudinal edges of a same one of said first and second fastening strips are staggered relative to each other.

\* \* \* \* \*